(12) United States Patent
Chen

(10) Patent No.: US 6,173,195 B1
(45) Date of Patent: Jan. 9, 2001

(54) WIRELESS MOBILE TELEPHONE ADAPTER FOR AUTOMOBILES

(76) Inventor: Chi-An Chen, No. 101-5, Lane Chu-Men, Jen-Wu Hsiang, Kaohsiung (TW)

( * ) Notice: Under 35 U.S.C. 154(b), the term of this patent shall be extended for 0 days.

(21) Appl. No.: 08/958,698

(22) Filed: Oct. 27, 1997

(51) Int. Cl.[7] .................................................. H04Q 7/20
(52) U.S. Cl. ............................................. 455/569; 455/575
(58) Field of Search .................................... 455/569, 575, 455/557, 556, 345

(56) References Cited

U.S. PATENT DOCUMENTS

| | | | |
|---|---|---|---|
| 5,367,556 | * 11/1994 | Marui et al. | 455/569 |
| 5,721,783 | * 2/1998 | Anderson | 381/328 |
| 5,802,167 | * 9/1998 | Hong | 455/569 |
| 5,867,794 | * 2/1999 | Hayes et al. | 455/575 |

* cited by examiner

Primary Examiner—Daniel S. Hunter
Assistant Examiner—Myron K. Wyche
(74) Attorney, Agent, or Firm—A & J

(57) ABSTRACT

A wireless mobile telephone includes a connector adapted for connecting to a socket of a mobile telephone to receive power supply and caller's signal from it, a first amplifier and a modulator circuit and a transmitter circuit connected in series to the connector and adapted to transmit caller's signal from the mobile telephone to a car radio, a microphone and a second amplifier connected in series to the connector and adapted to transmit the user's voice signal to the mobile telephone for output to the opponent's mobile telephone, whereby a user can use the mobile telephone without holding it in his or her hand.

1 Claim, 6 Drawing Sheets

WIRELESS MOBILE TELEPHONE ADAPTER FOR AUTOMOBILES

BACKGROUND OF THE INVENTION

1. Field of the Invention

This invention relates to mobile telephone adapters, and more particularly to a wireless mobile telephone adapter for automobiles.

2. Description of the Prior Art

FIG. 1 shows a mobile telephone adapter for use in a car according to the prior art. This structure of mobile telephone adapter comprises a speaker 11, a connector 1 for connection to socket for cigarette lighter of the car to receive power supply from it and to provide received power supply to the speaker 11, a plug 14 for connection to a socket 13 of a mobile telephone 12 to receive caller's voice signal for output through the speaker 11, a microphone 15 for receiving the user's voice signal for transmission to the caller through the mobile telephone 12 via the plug 14, and an electric cable 16 connecting the plug 14 and the microphone 15 to the connector 1 through the speaker 11. This structure of mobile telephone adapter has drawbacks. Because the plug 14, the microphone 15 and the speaker 11 are connected together by the electric cable 16 and the electric cable 16 has a certain length, the whole assembly cannot be firmly retained in place. When driving, the microphone 15 tends to be shaken with the electric cable 16, causing the transmission quality to be affected.

SUMMARY OF THE INVENTION

This invention relates to mobile telephone adapters, and more particularly to a wireless mobile telephone adapter for automobiles.

This invention has been accomplished to provide a wireless mobile telephone adapter for automobiles which eliminates the aforesaid problem. According to the present invention, the wireless mobile telephone adapter comprises a connector adapted for connecting to a socket of a mobile telephone to receive power supply and caller's signal from it, a first amplifier and a modulator circuit and a transmitter circuit connected in series to the connector and adapted to transmit caller's signal from the mobile telephone to a car radio, a microphone and a second amplifier connected in series to the connector and adapted to transmit the user's voice signal to the mobile telephone for output to the opponent's mobile telephone.

DETAILED DESCRIPTION OF THE PREFERRED EMBODIMENT

Figure 1:
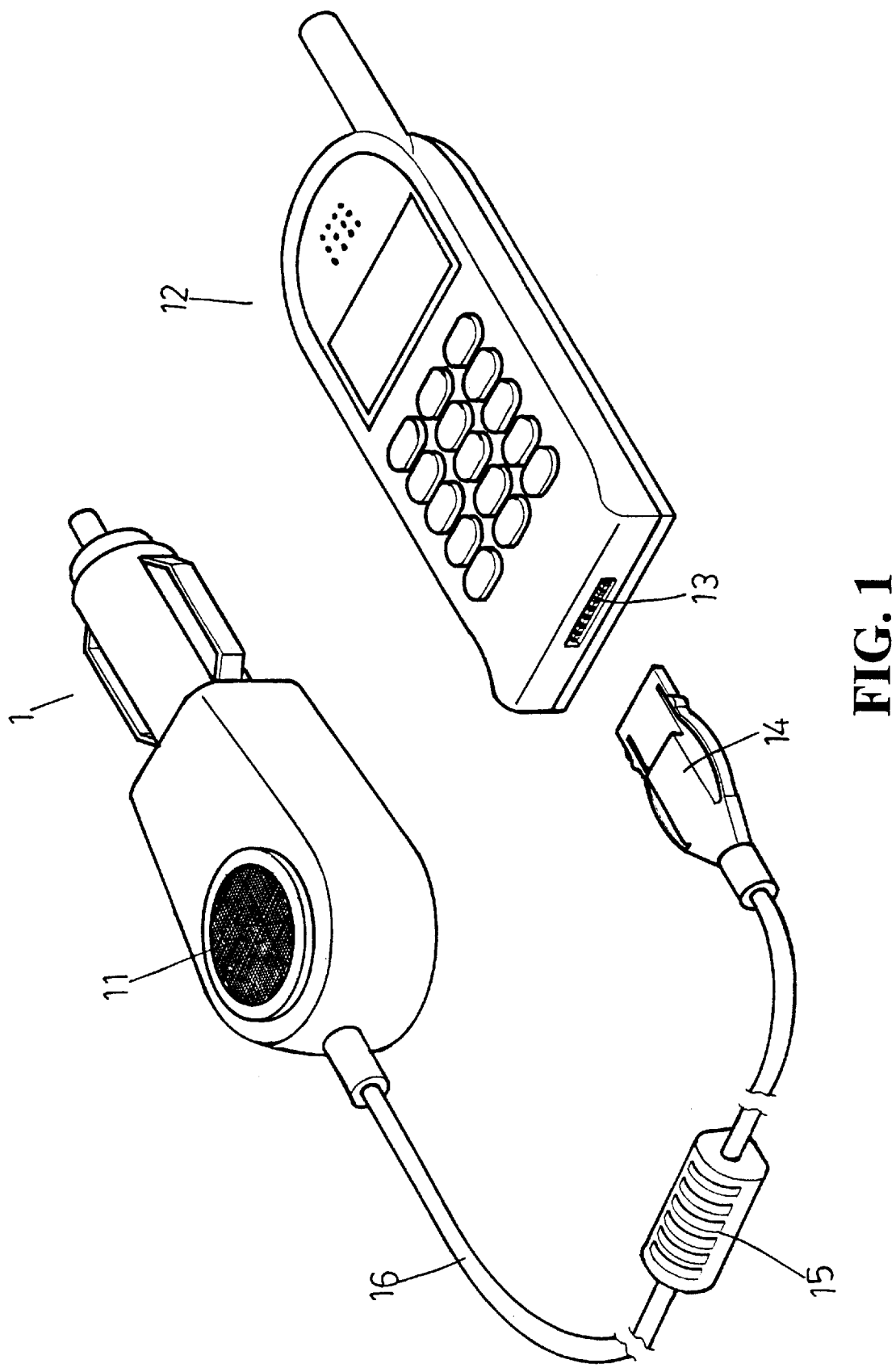
FIG. 1 shows a mobile telephone adapter for automobiles according to the prior art.
Figure 2:
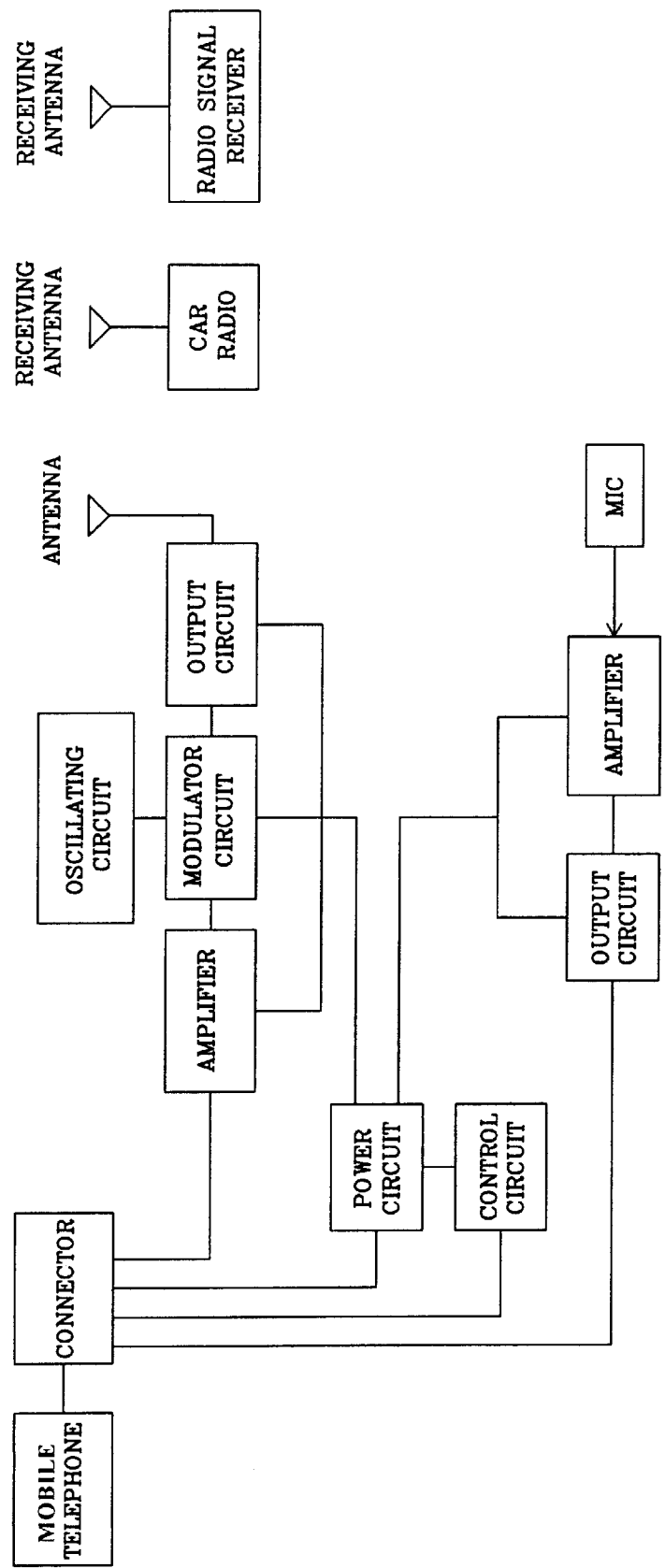
FIG. 2 is a system block diagram of the present invention.
Figure 3:
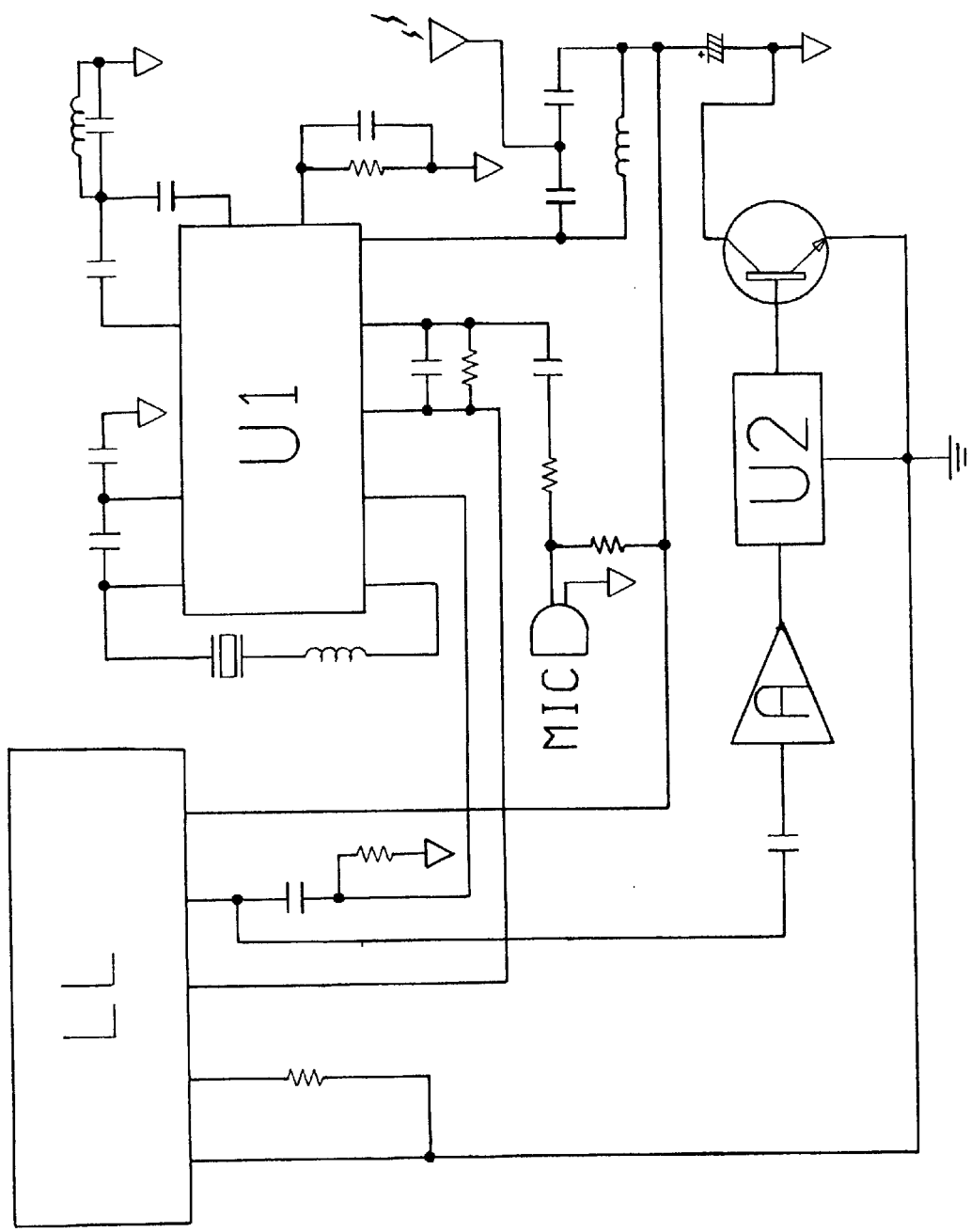
FIG. 3 is a circuit block diagram of the present invention.

Referring to FIGS. 2 and 3, a connector LL is provided to input power supply and receiving/transmission signal from a mobile telephone to the wireless mobile telephone adapter. A power control which is comprised of IC U2 and amplifier A is provided to control the necessary power supply. Received receiving signal from the connector LL is modulated by IC U1 into corresponding radio signal, and then transmitted into the air through a transmitting circuit for receiving by a movable radio signal receiver or a car radio antenna. The wireless mobile telephone adapter further comprises a concealed microphone adapted to pick up the voice of the user and to convert it into a corresponding electrical signal, and an amplifier adapted to amplifier signal obtained from the microphone, permitting amplified signal to be transmitted to the mobile telephone through the connector LL.

Figure 4:
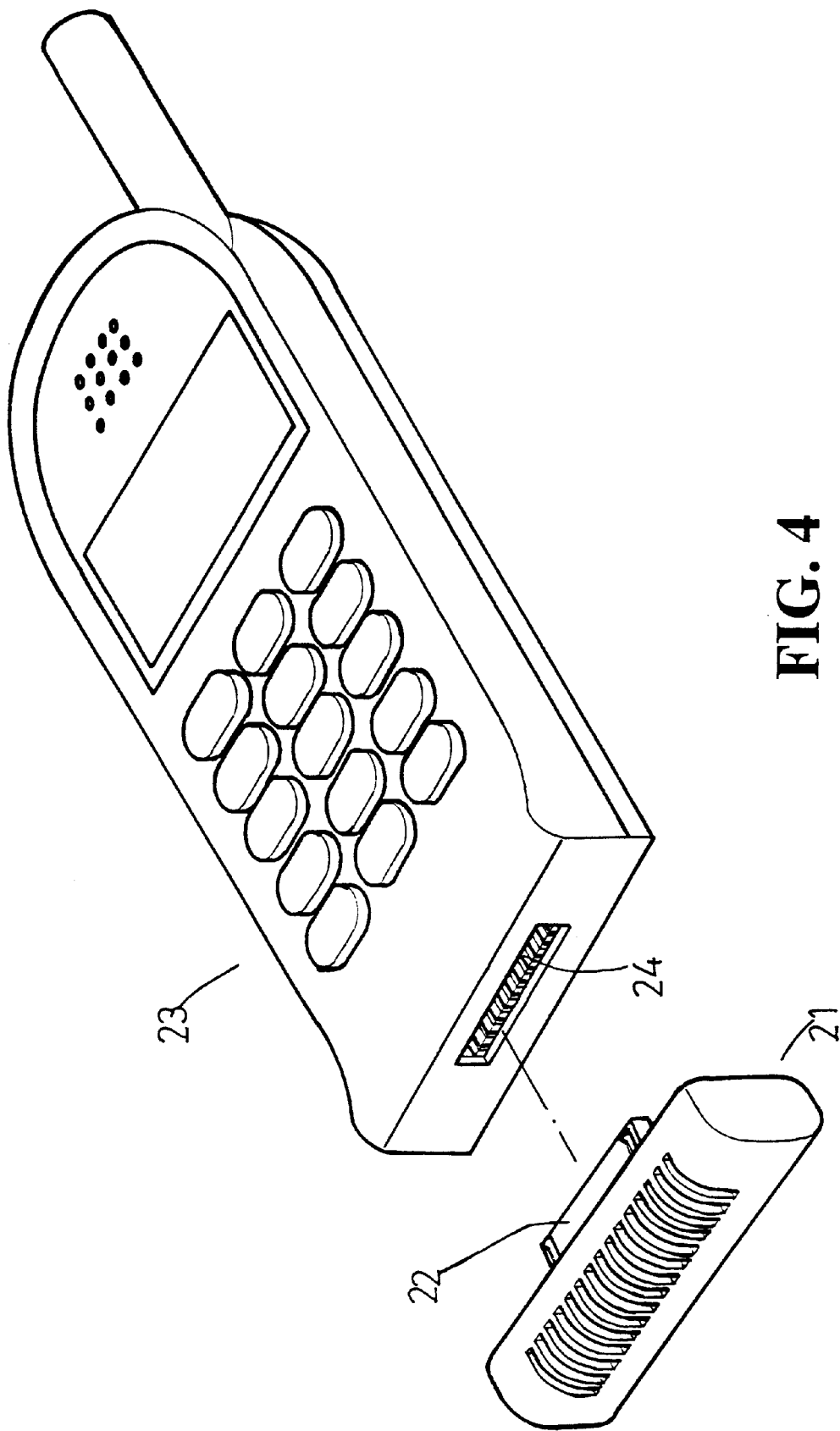
FIG. 4 shows the relationship between the wireless mobile telephone adapter and the mobile telephone according to the present invention.
Figure 5:
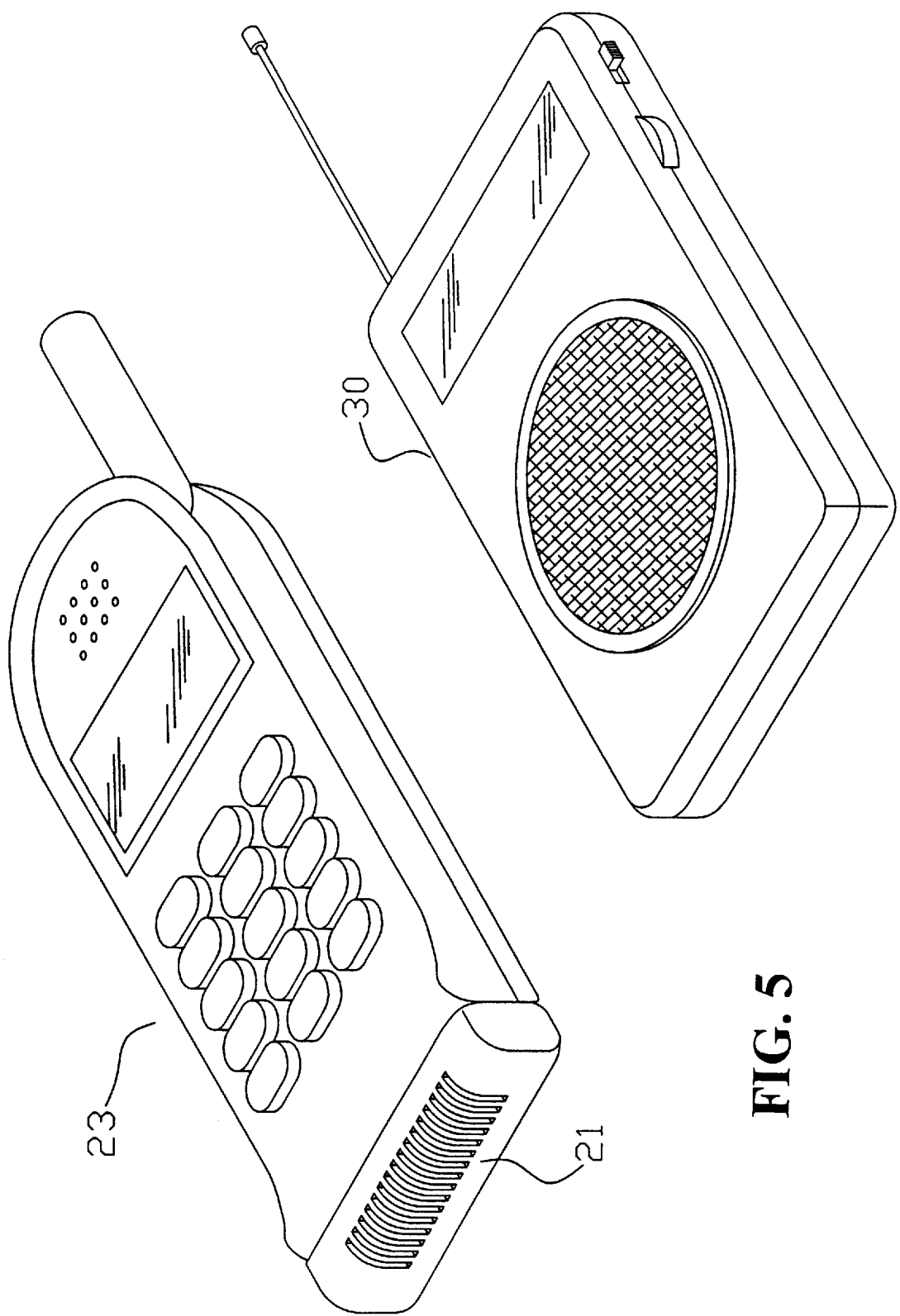
FIG. 5 illustrates how the mobile telephone is used in association with a radio signal receiver.

Referring to FIGS. 4 and 5, the connector 22 of the wireless mobile telephone adapter 21 is connected to a socket 24 of a mobile telephone 23, therefore the wireless mobile telephone adapter 21 can receive power supply and receiving/transmission signal from the mobile telephone 23. When a user desires to use the mobile telephone 23 without holding it in his or her hand, it is only necessary to depress the call button of the mobile telephone 23, permitting the voice signal of the caller to be transmitted from the mobile telephone 23 through the connector 22 to the movable radio signal receiver 30 (see FIG. 5) by radio, so that the user can hear the caller's voice from the speaker of the movable radio signal receiver 30. When the user answers the caller, the voice of the user is received by the microphone of the wireless mobile telephone adapter 21 and transmitted through the connector 22 to the receiving circuit of the mobile telephone 23, and then transmitted to the caller's telephone by the mobile telephone 23 by radio.

Figure 6:
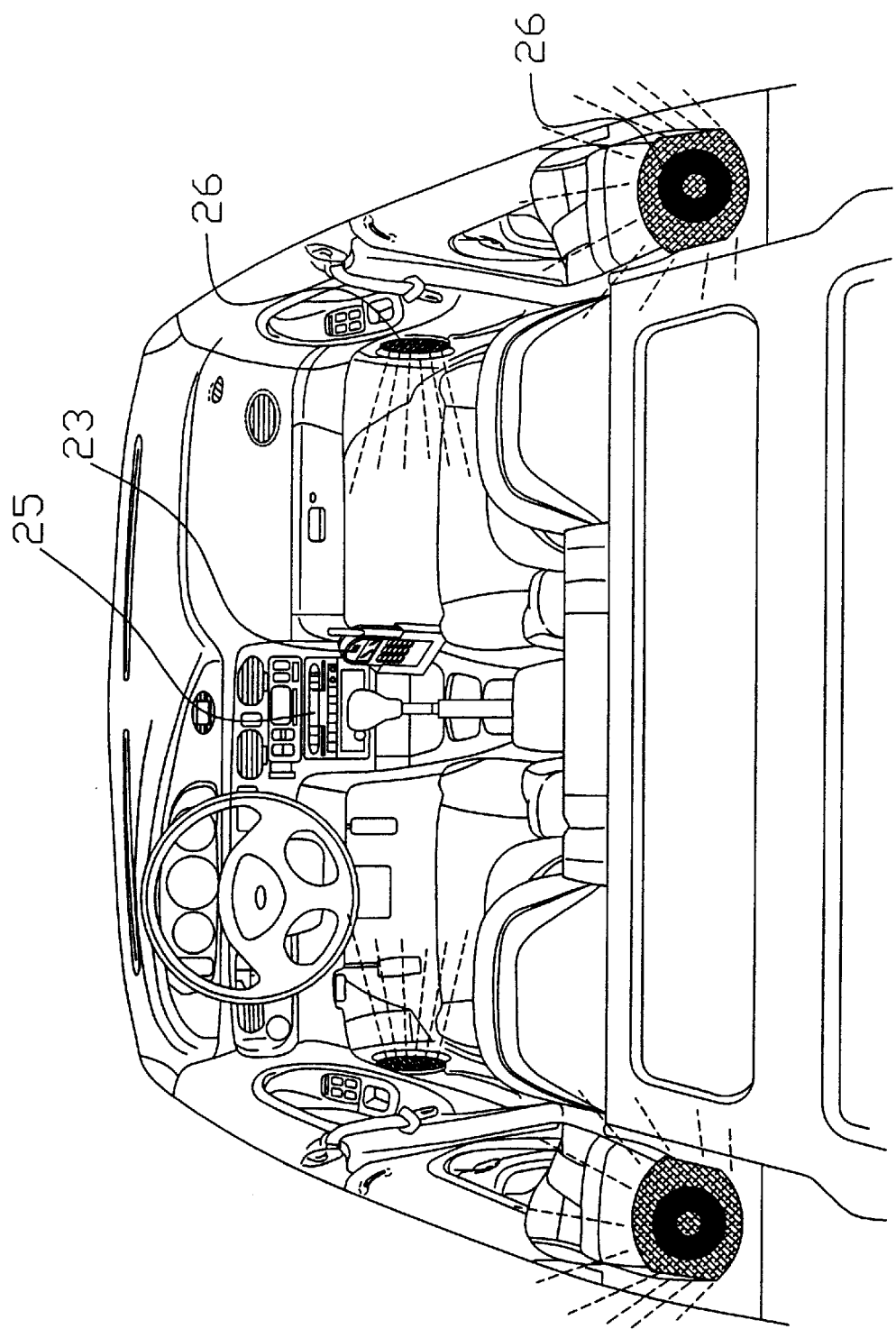
FIG. 6 is an applied view of the present invention, showing the wireless mobile telephone adapter installed in a car and operated.

Referring to FIG. 6, when one desired to receive a phone call from the mobile telephone 23 during driving, the car radio 25 is first adjusted to a predetermined channel, so that when the mobile telephone 23 is rung up, it is only necessary to depress the call button of the mobile telephone 23 thereby permitting the voice signal of the caller to be transmitted from the mobile telephone 23 through the connector 22 to the wireless mobile telephone adapter 21 and then transmitted from the wireless mobile telephone adapter 21 to the receiving antenna of the car radio 25 by radio. Hence, the user can hear the caller's voice from the speaker 26 of the car radio 25. When the user answers the caller, the voice of the user is received by the microphone of the wireless mobile telephone adapter 21, transmitted through the connector 22 to the receiving circuit of the mobile telephone 23, and then transmitted to the caller's telephone by the mobile telephone 23 by radio.

Because the wireless mobile telephone adapter 21 is directly connected to the socket 23 of the mobile telephone 24 to complete electrical connection, the installation of the present invention is simple. Further, because the wireless mobile telephone adapter is to be used with a mobile telephone in a car, less radio wave strength is required for covering the antenna of the car radio, therefore the message of the communication can be well protected and the operation of the wireless mobile telephone adapter does not interference with the radio equipment of other cars.

What is claimed is:

1. A wireless mobile telephone adapter comprising a connector adapted for connecting to a socket of a mobile telephone to receive an external power supply and caller's signal from it, power and control circuits for controlling said external power supply from said mobile telephone, a first amplifier connected to said connector to receive caller's signal from it and to amplify received caller's signal, a modulator circuit connected to said first amplifier to receive amplified caller's signal from it and to modulate received caller's signal into corresponding radio signal, a transmitting circuit connected to said modulator circuit to receive radio signal from it and to transmit received radio signal to a car radio through a transmitting antenna thereof, a microphone adapted to pick up voice signal form the user and to convert received voice signal into corresponding electric signal for transmission to said mobile telephone, a second amplifier connected between said microphone and said connector and adapted to amplify signal from said second amplifier for transmission to said mobile telephone through said connector, a movable radio signal receiver for receiving radio signal transmitted by said transmitting circuit, whereby radio signal transmitted by said transmitting circuit can be received by a receiving antenna of a car radio.

* * * * *